United States Patent [19]
Virtuoso et al.

[11] Patent Number: 5,594,952
[45] Date of Patent: Jan. 14, 1997

[54] DEVICE FOR INTEGRATION BETWEEN VOICE AND DATA RADIO COMMUNICATION

[75] Inventors: Salvatore Virtuoso, Arcore; Alberto Parolo, Milan, both of Italy

[73] Assignee: International Business Machines Corporation, Armonk, N.Y.

[21] Appl. No.: 392,720

[22] Filed: Feb. 23, 1995

[30] Foreign Application Priority Data

Apr. 29, 1994 [IT] Italy .................................. MI94A0817

[51] Int. Cl.$^6$ ................. H04B 1/40; H04Q 7/32
[52] U.S. Cl. ............... 455/89; 455/74; 455/348; 455/349; 379/59; 379/357; 375/222
[58] Field of Search .............. 455/89, 90, 348, 455/349, 74, 76, 351; 379/58, 59, 357; 375/216, 222

[56] References Cited

U.S. PATENT DOCUMENTS

| | | | |
|---|---|---|---|
| 5,423,086 | 6/1995 | Cannon et al. ................ | 455/89 X |
| 5,448,765 | 9/1995 | Kovanen et al. .............. | 455/89 X |
| 5,465,401 | 11/1995 | Thompson ..................... | 455/89 |

FOREIGN PATENT DOCUMENTS 9429968  12/1994  WIPO ..................... 455/89

OTHER PUBLICATIONS

Patton, Carole, "Radio Transceiver Circuit Card Acts As Wireless Modem in PCs," Info World, p. 18, Mar. 28, 1988.

*Primary Examiner*—Chi H. Pham
*Attorney, Agent, or Firm*—Stephen T. Keohane; John D. Flynn

[57] ABSTRACT

The invention relates to an assembly for radio communication containing all the electronic components necessary for radio transmission/reception, which can alternatively be connected to a device for voice communication and to a device for data communication.

The device for voice communication with the assembly (which, according to the preferred embodiment of the invention, is implemented on a reduced dimension PCMCIA integrated circuit card) plugged therein, has more or less the same dimension and the same weight of a usual cellular phone device.

When radio data transmission is desired the PCMCIA integrated circuit card is to be unplugged from the telephone handset and plugged into a data processing device properly arranged. In this way the data processing device is provided with the capability of radio transmitting and receiving data.

2 Claims, 5 Drawing Sheets

SECTION (B)

000# DEVICE FOR INTEGRATION BETWEEN VOICE AND DATA RADIO COMMUNICATION

FIELD OF THE INVENTION

The invention relates to wireless communication and more particularly to the integration between data and voice wireless communication. Further more particularly the invention relates to a radio communication assembly comprising means for transmitting radio signals and means for receiving radio signals.

BACKGROUND OF THE INVENTION

Advances in wireless communication technology have boosted the usage of portable cellular phones and it is not difficult to foresee a huge potential also for wireless data communication. Wireless voice and data communication basically share the same technology, but they are engineered to suit only voice or data usages. A need is felt for tight integration of cellular phone devices with data processing equipment for data communication purpose, while maintaining full operability of voice communication functions.

A known solution to this problem is to allow the wireless transmission and receipt of data by externally connecting a usual handheld cellular phone to a computer (e.g. a "notebook" computer) through a modem and a cable. The resulting assembly has the drawback of an unpractical use and a seriously reduced portability, due to the shaky connection, during data transmission.

A different existing approach is constituted by portable computers with built-in cellular radio, such as for example the IBM PC-RADIO which represents a fully self-contained wireless transmission device. A drawback of the above solution is that its useability as portable voice communication device is compromised by the weight and dimension of the device itself.

SUMMARY OF THE INVENTION

The present invention has the object to overcome the above drawbacks of the prior art by providing an assembly as described above characterized by an interface to alternatively connect the assembly to a device which provides the functions for voice communication or to a device which provides the functions for data communication.

Thus the present invention realizes an integrated device for data communication and a light-weight, small-size, independent portable phone when voice communication is desired, avoiding the duplication of those electronic components strictly related to the radio communication which are the same in the telephone devices and in the data transmission devices.

DETAILED DESCRIPTION

A conventional cellular phone and a cellular device for data communication share much of their technology and, though their physical appearance can significantly differ, have several common components.

In addition, these components make up most of the manufacturing costs of the cellular devices and include the items that characterize the devices as the subject of the service contract between the user and the network Operator.

Figure 1:
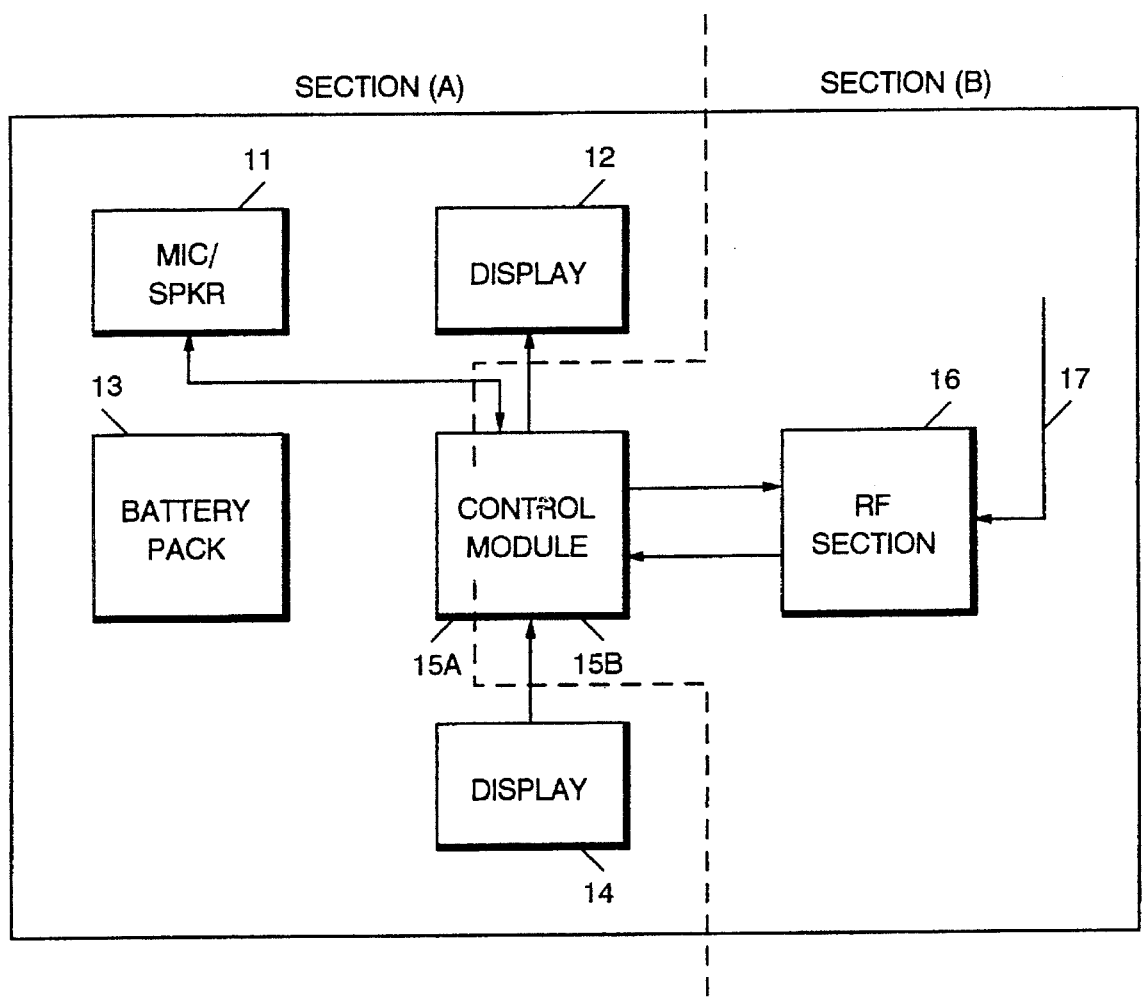
FIG. 1 is a schematic representation of the main cellular phone components.

FIG. 1, while representing the main cellular phone components, shows the invention basic concept, which is to split the functions of a cellular phone in two parts, one containing the components peculiar of the human interface (section a), that is microphone/speaker (11), display (12), battery (13), keypad (14), control module (15a) and the other (section b) containing the components strictly related to radio transmission, which are a control module (15b), a Radio Frequency (RF) section (16) and an antenna (17). The RF section, which has the function to generate, transmit and receive the radio frequency wave is an electronic component well known in the art and its structure can significantly change according to the kind of transmission (digital or analog) used. The skilled person will however have no difficulties to identify the suitable type of electronic component and to adapt the manufacturing to the different requirements. Using this concept, the sections (a) and (b) can be used together or separately, according to the task the user intends to accomplish at any given time.

The above schematic representation is independent from the network technology (i.e. digital or analog) the cellular device is built for, even if there will be, however some differences in the implementation, described later in this document.

Figure 2:
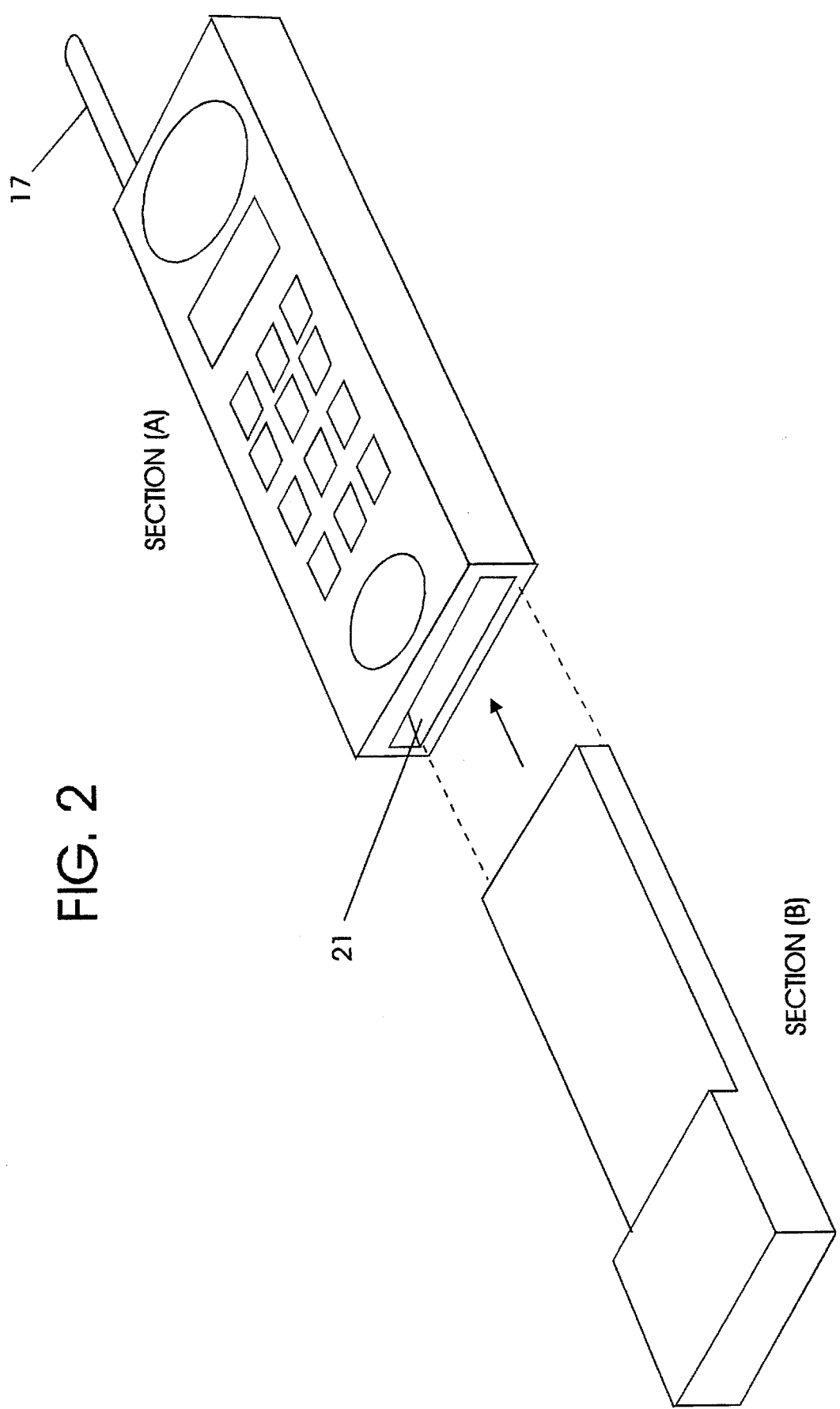
FIG. 2 is a schematic representation of a telephone handset using the integrated circuit of the present invention.

FIG. 2 shows an implementation of the above described two sections cellular phone according to a preferred embodiment of the present invention. Section (a) is an handset similar to those used for conventional portable phones; this handset provides all the functions needed for the human interface with the transmission device. The antenna (17) is according to FIG. 2 part of the section (a), while in the logical scheme of FIG. 1 was part of section (b). Its real position is not really important and the system can work equally well in both cases. Section (b) is built on an adapter which complies with a widely used and accepted electrical and mechanical standard, such as the PCMCIA 2.0. The adapter fits in a socket compliant to the same standard and properly designed on purpose in the handset of section (a). The PCMCIA standard has been chosen for its wide acceptance in the industry; however other kinds of connections can be used as well.

When sections (a) and (b) are connected together, the resulting assembly is substantially identical to a conventional portable phone. Section (b) alone, being compliant to a standard widely accepted also in the Information Technology industry, can be plugged in any data processing system compliant to the same standard, the resulting assembly implementing a totally integrated system for wireless data communication.

Figure 3:
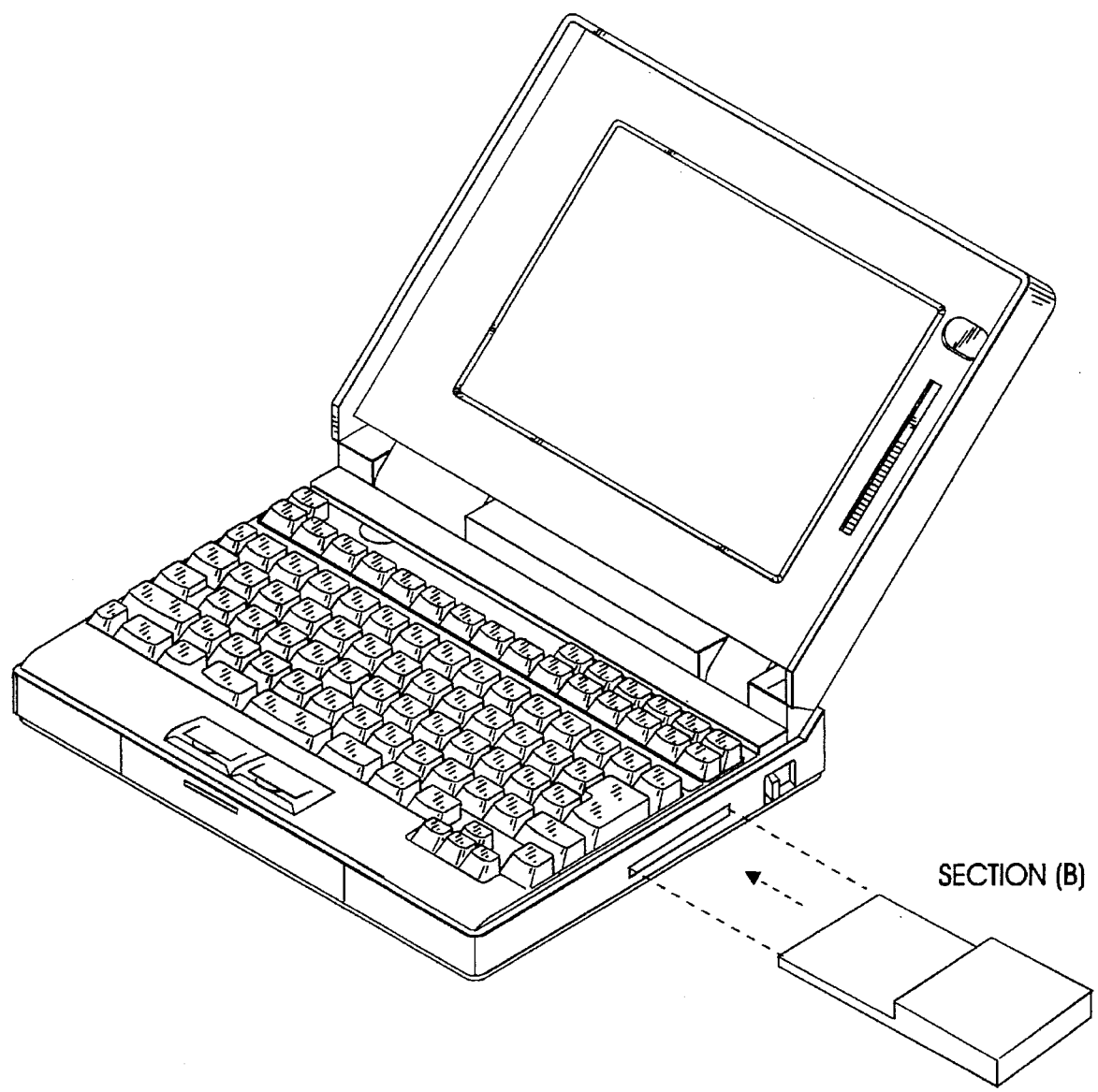
FIG. 3 is a schematic representation of a data processing device using the integrated circuit of the present invention.

FIG. 3 shows an implementation of the above mentioned two sections integrated system for wireless data communication according to a preferred embodiment of the present invention. Section (a) is a portable system (e.g. a notebook computer) providing all the functions needed for data processing. Section (b) is the same as in FIG. 2.

While our preferred embodiment is described with reference to a data processing device for the transmission of data, other kind of transmission device can be equipped with the PCMCIA adapter (section b) (e.g. a FAX transmission/reception device).

Figure 4:
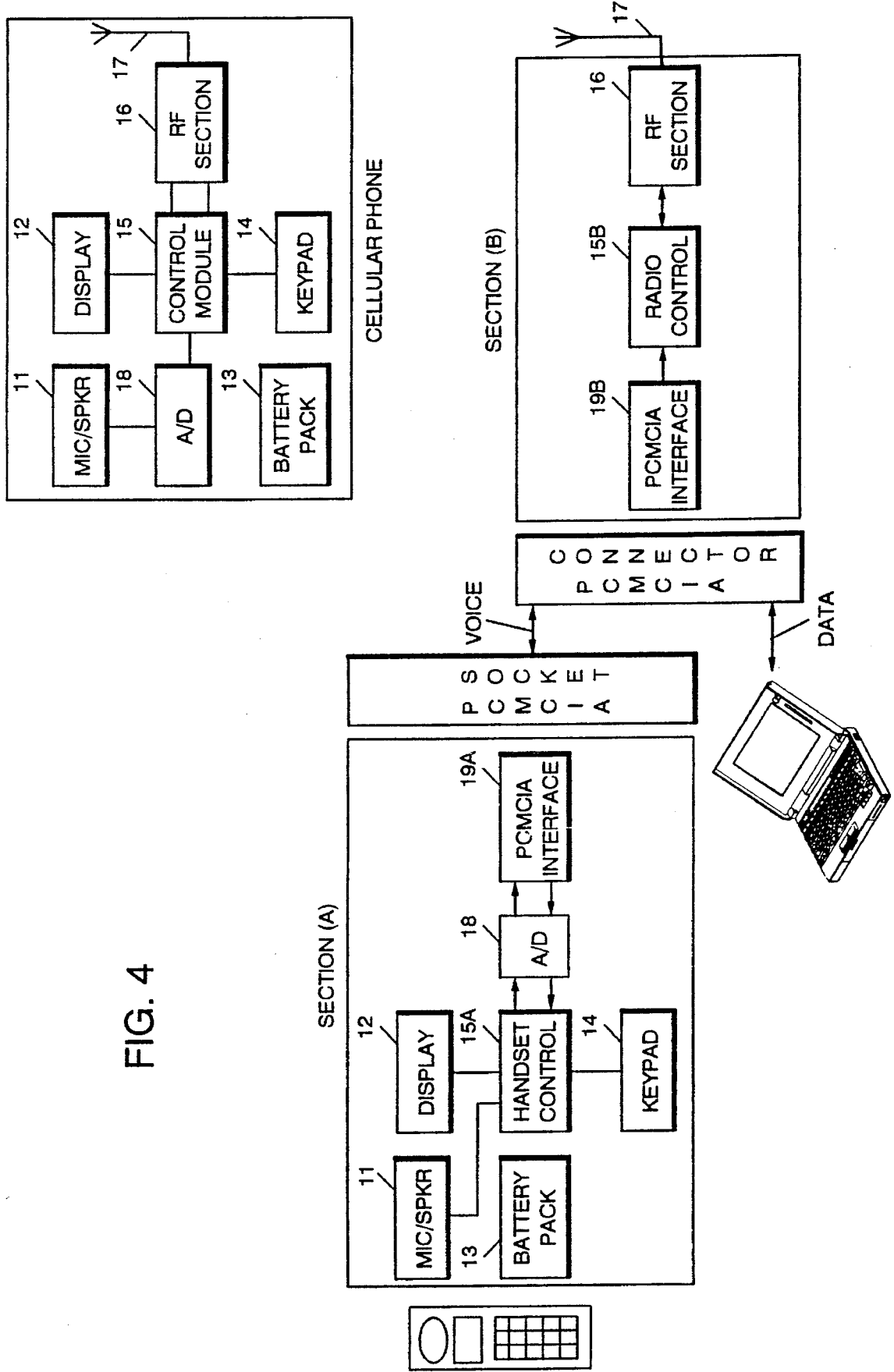
FIG. 4 is a schematic representation of a preferred embodiment of the invention using digital cellular phone transmission.

FIG. 4 is a schematic representation of the main components of a digital cellular phone. It includes a microphone/speaker (11), a display (12), a battery pack (13), a keypad (14), a radiofrequency (RF) section (16), a module (15) to control either the handset functions and the radio section and an antenna (17). The analog signal from the microphone is converted to a digital bit stream through a A/D converter (18) and the inverse operation is done with the received data to drive the speaker (11). In this example, the sections (a) and (b) will be designed as follows:

Section (a):
 microphone/speaker (11);
 display (12);
 battery pack (13);
 keypad (14);
 control module (15a) for the handset related functions;
 A/D converter (18).

Section (b):
 RF section (16);
 control module (15b) for the radio section functions
 antenna (17).

Section (a) also includes a PCMCIA interface (19a), designed to emulate the behaviour of a data processing system. Section (b) includes a PCMCIA interface (19b), compliant the PCMCIA 2.0 standard, matching the corresponding interface on section (a).

The microphone/speaker (11), the display (12), the battery (13) and the keypad (14) are strictly related to the voice communication function. The RF section (16), on the contrary, is necessary in all the radio communication devices and is analogous to the RF section of a data radio communication apparatus.

All data exchanged between sections (a) and (b) flow through the PCMCIA interface, either in the usage as a cellular phone or as a data communication device. Section (b) does not distinguish between digitized voice and data, thus allowing transparent swapping from the handset (a) and a data processing system which has been properly enabled to connect with a PCMCIA interface.

Figure 5:
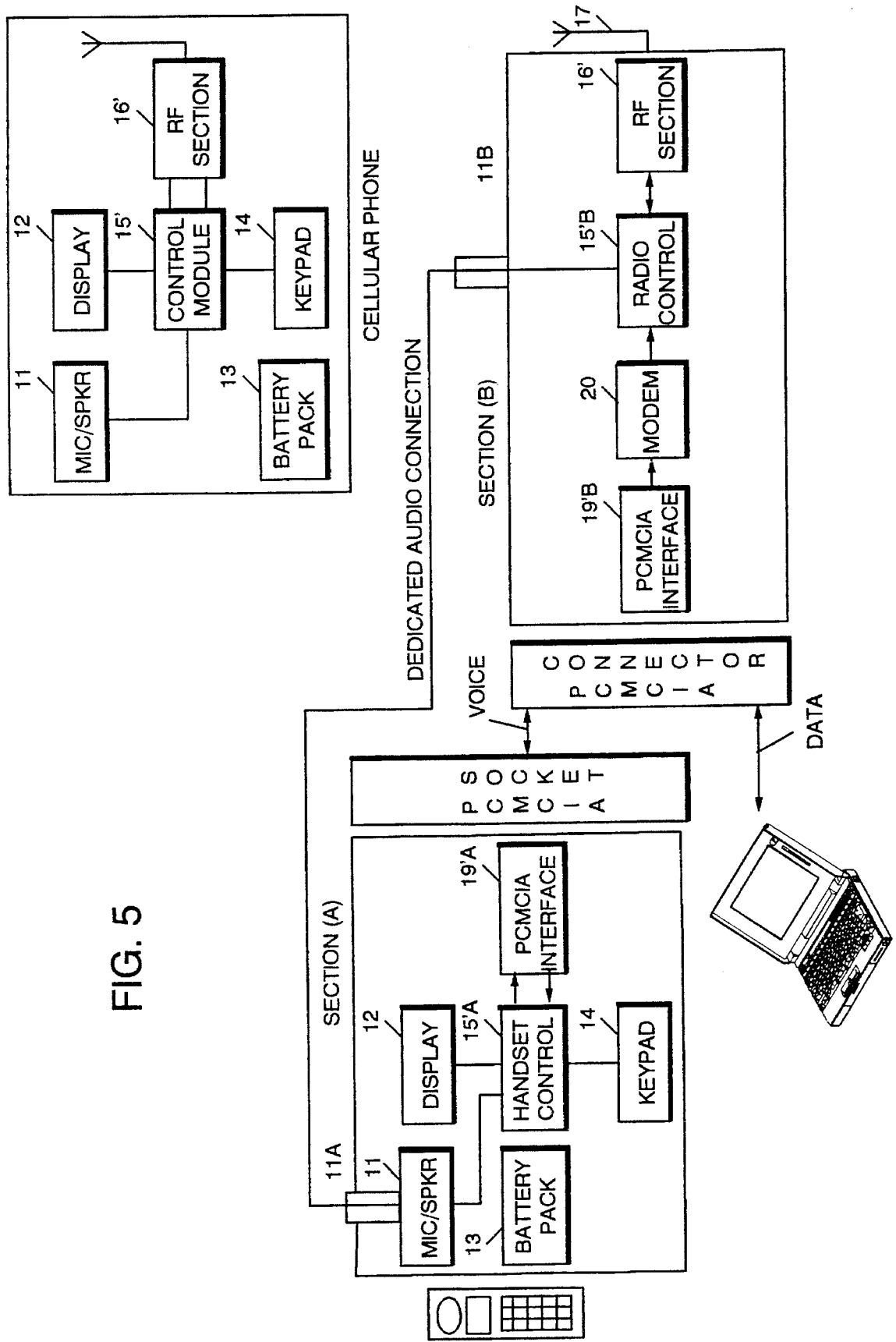
FIG. 5 is a schematic representation of a preferred embodiment of the invention using analog cellular phone transmission.

FIG. 5 is a schematic representation of the main components of an analog cellular phone. It includes a microphone/speaker (11), a display (12), a battery pack (13), a keypad (14), a radiofrequency (RF) section (16 ') and a module (15') to control both the handset functions and the radio section. Since the analog signals are not supported by current PCMCIA implementation, to avoid incompatibilities with future releases it has been chosen to carry out the corresponding connections through a separated connector, used only when section (b) is connected to section (a), and not required for data communication. A data modem (20) is also required for data communication, because in this implementation the control module (15'b) and the RF section (16') are expected to receive analog signals.

The sections (a) and (b) will then be designed as follows:
Section (a):
 microphone/speaker (11);
 microphone/speaker connector (11a);
 display (12);
 battery pack (13);
 keypad (14);
 control module (15'a) for the handset related functions.

Section (b):
 RF section (16');
 data modem (20);
 control module (15'b) for the radio section functions;
 microphone/speaker connector (11b) which connects to (11a)
 antenna (17).

Section (a) also includes a PCMCIA interface (19'a), designed to emulate the behaviour of a data processing system. Section (b) includes a PCMCIA interface (19'b), compliant the PCMCIA 2.0 standard, matching the corresponding interface on section (a).

While section (b) is plugged in data processing device, the digital data flow is exchanged through the PCMCIA interface (19') and the modem. While section (b) is plugged in a telephone handset the analog signal from the microphone (11) is directly input to the control module (15'b) through the connection (11a–11b). The PCMCIA interface is required, because the PCMCIA adapter (section b) must be configured according to the desired mode of operation by the control module (15'a) when connected with section (a) for voice communication or by the data processing device for data communications.

We claim:

1. An adapter comprising:

a transmitter for transmitting radio signals;

a receiver for receiving radio signals;

a first interface means for outputting digital data from the adapter and for inputting digital data to the adapter;

a modem providing analog signals for transmission by the transmitter from digital data obtained by the first interface means and for providing digital data to the first interface means from analog signals obtained from the receiver;

a second interface means for outputting analog signals from the adapter obtained directly from the receiver and for inputting analog signals to the adapter directly to the transmitter; and a control module for configuring the adapter to enable communication via the first interface means or the second interface means, said control module selecting the first interface means or the second interface means based upon a specified mode of operation obtained via the first interface means.

2. The adapter of claim 1 wherein the first interface means is in compliance with a PCMCIA standard.

* * * * *